United States Patent [19]
Jones

[11] 3,778,009
[45] Dec. 11, 1973

[54] AERODYNAMIC SURFACES

[75] Inventor: Peter Killcross Jones, Macclesfield, England

[73] Assignee: Hawker Siddeley Aviation Limited, Surrey, England

[22] Filed: June 23, 1971

[21] Appl. No.: 155,704

[30] Foreign Application Priority Data
June 23, 1970 Great Britain............... 30,512/70

[52] U.S. Cl. .................. 244/42 DA, 244/42 DB
[51] Int. Cl. ....................... B64c 3/56, B64c 9/18
[58] Field of Search................ 244/42 R, 42 CB, 244/42 CC, 42 D, 42 DA, 42 DB, 42 DC, 40 R, 43

[56] References Cited
UNITED STATES PATENTS

| | | | |
|---|---|---|---|
| 1,670,852 | 5/1928 | Fowler | 244/42 R |
| 1,881,463 | 10/1932 | Gaines | 244/42 CB |
| 2,202,430 | 5/1940 | Rebeski | 244/42 DB |
| 2,589,026 | 3/1952 | Phillips | 244/42 DB |
| 2,624,532 | 1/1953 | Butler | 244/42 DB |
| 3,326,500 | 6/1967 | Lanier | 244/42 CB |

Primary Examiner—Milton Buchler
Assistant Examiner—Barry L. Kelmachter
Attorney—Rose & Edell

[57] ABSTRACT

A high lift device at the trailing edge of an aircraft wing, consisting of members that can be extended or inflated to produce a bluff thickened trailing edge of generally semicylindrical profile. Air is blown over this semi-cylindrical profile from one or more naturally or forcibly blown slots to achieve boundary layer control.

11 Claims, 6 Drawing Figures

PATENTED DEC 11 1973 3,778,009

SHEET 1 OF 2

AERODYNAMIC SURFACES

This invention relates to aerodynamic surfaces. More particularly, it is concerned with trailing edge devices for aircraft wings and the like to produce high lift at low flight speeds.

According to the present invention, a high lift device for the trailing edge of an aircraft wing or the like comprises means to adjust the trailing edge configuration to a bluff or rounded shape and one or more slots for issuing air rearwardly over said bluff trailing edge.

This device replaces the conventional trailing edge flap. It is deployed during take-off and landing maneuvers and the lift produced is less sensitive to changes of wing incidence than that obtained from a conventional flap system. The device may make use of forced blowing through slots to control the boundary layer over the upper surface. Natural blowing, from the lower to the upper surface, may also be incorporated.

The device may be constructed either from movable rigid surfaces, or it may incorporate a pressurized flexible bag to form parts of the aerodynamic surfaces.

Figure 5:
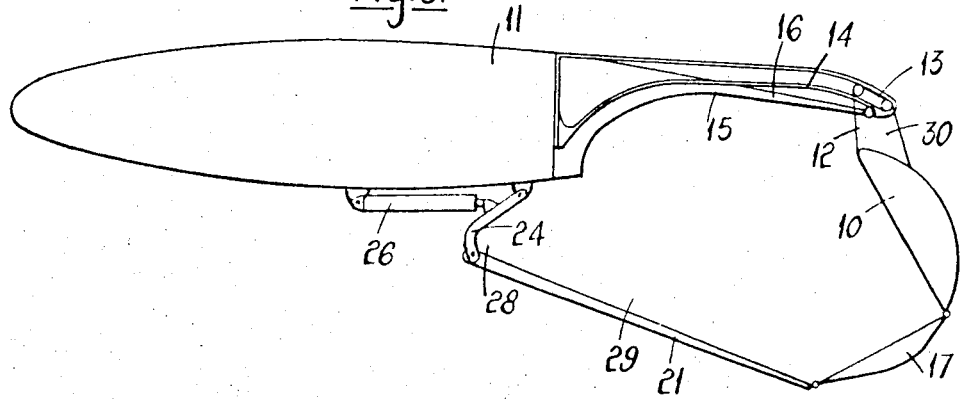
Figure 6:
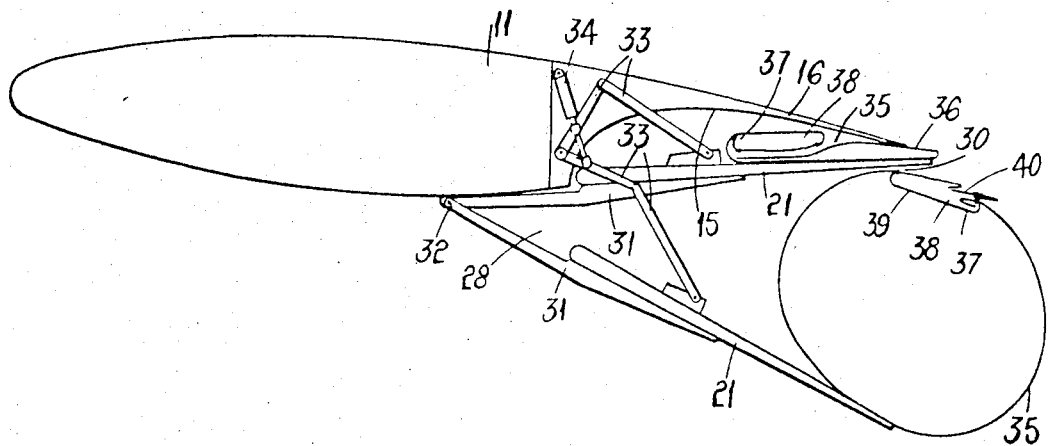

Various arrangements in accordance with the invention will now be described by way of example and with reference to the accompanying drawings, in which:

FIGS. 1 to 5 show, in diagrammatic side elevation, five successive positions of the high lift device in one form of wing embodying the invention, and FIG. 6 illustrates another embodiment.

The device shown in FIGS. 1 to 5 comprises three movable aerodynamic elements situated, when retracted, in the region of the trailing portion 16 of an aircraft wing 11 within a recess 15 in the underside of the trailing portion. The first element 10 takes the form in cross-section of a segment of a circle which has its flat side underneath. The forward portion of this segment is secured to a bracket 12 forming part of a trolley 13 which runs along a fore-and-aft curved track 14 extending above the wing recess 15. The second element 17 is smaller and flatter than the segment 10 and lies immediately to the rear of it, the forward edge of the element 17 being hinged on the rear edge of the segment 10 at 18. In the retracted position, the element 17 projects rearward beyond the trailing edge of the fixed part of the wing and its upper rear surface 19 is shaped to constitute a rearward continuation of the fixed upper surface 20 of the trailing edge of the wing.

The third element is in the form of a plate-like member 21 lying immediately under the elements 10 and 17, with its undersurface 22 forming the trailing portion of the wing undersurface and thereby closing off the recess 15. The rear edge of the plate member 21 is hinged on the rear edge of the element 17 at 23, and the forward end of the plate member 21 is pivotally supported at 25 on the rear ends of levers 24 which are in turn pivotally mounted at their forward ends on fixed structure at the lower part of the wing. A jack 26 is provided for swinging the levers 24 downward and forward about their pivotal mountings 27 on the main wing structure.

Figure 1:
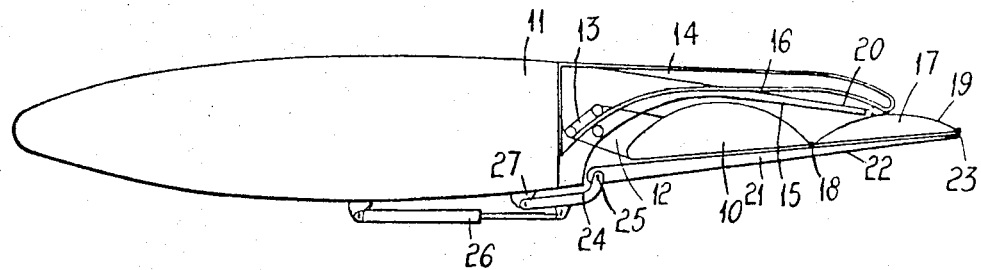
Figure 2:
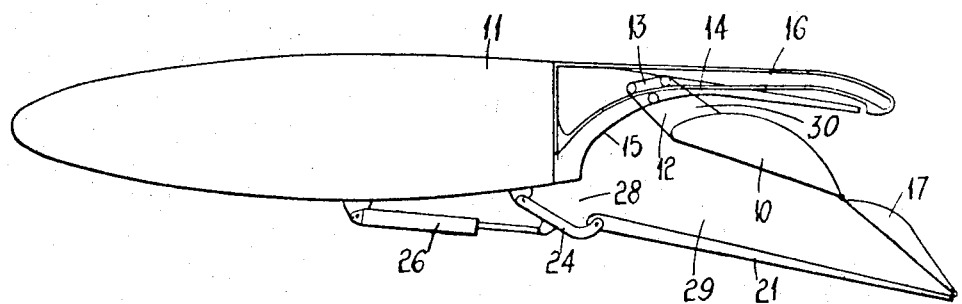
Figure 3:
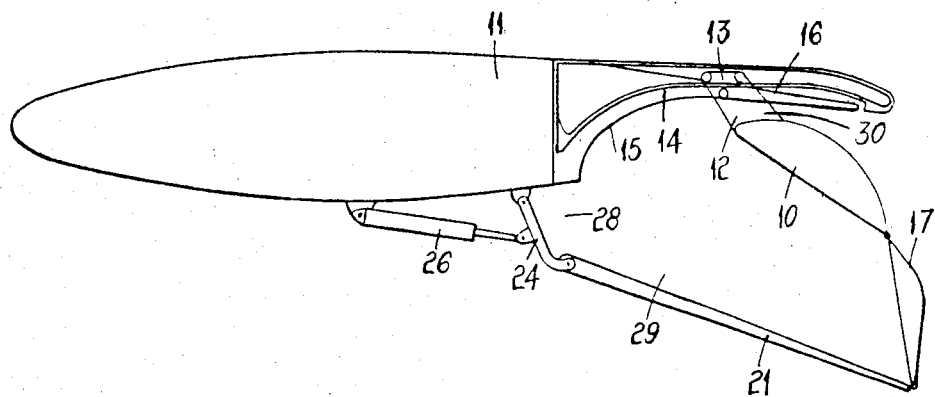
Figure 4:
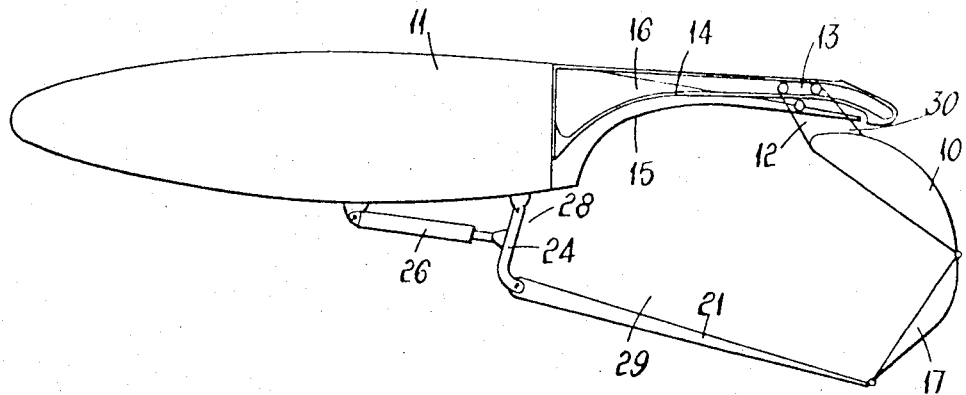

In operation, the high lift device is extended by rearward travel of the trolley 13 along the track 14 and simultaneous downward swinging of the levers 24. The curvature of the forward portion of the track causes the segment 10 to deflect downward at the rear, and this movement, combined with a dropping and slight shift forward of the plate 21 as the lever 24 swings, brings about a somewhat greater degree of downward deflection of the segment 17 (FIG. 2). The plate 21 has shifted from the position in which it closes off the recess 15 and slopes up somewhat in the rearward direction, to a lower position in which it slopes down to the rear. This opens a scoop-type gap 28 between the forward edge of the plate 21 and the wing through which air may enter into the space 29 bounded by the segments 10, 17 and the plate 21 and, as a result, air blows out naturally over the upper surfaces of the segments 10 and 17 through a slot 30 formed between the nose of the segment 10 and the fixed trailing portion 16 of the wing. The middle portion of the length of the track 14 is substantially straight and therefore does not bring about increase in deflection of the segment 10, but continued rearward movement of the segment 10 and continued dropping and forward shift of the plate 21 causes extreme deflection of the segment 17 (FIG. 3). The segment 17 passes through the vertical into a disposition in which its lower edge is forward of its upper edge (FIG. 4), and it will be seen that the elements 10, 17 and 21 now define a bluff substantially semi-cylindrical wing trailing edge. The rear end portion of track 14 is again curved causing further angular movement of the segments 10 and 17 and widening of the slot 30 as the terminal configuration shown in FIG. 5 is approached.

In the arrangement of FIG. 6, the plate 21 closing off the recess 15 is supported at its forward end on brackets 31 which extend further forward and are hinged on the fixed wing structure 11 at 32. Lowering and raising of this plate 21 about the hinge point 32 is accomplished by means of articulated links 33, connected between the fixed structure and the plate 21, and a jack 34 coupled to one of these links. The segments 10 and 17 of the arrangement of FIGS. 1 to 5 are replaced by an inflatable flexible bag 35 which lies folded substantially flat within the recess 15 when the device is retracted. In this position, a portion 36 of the bag wall forms a rearward continuation of the upper trailing surface of the wing. The bag 35 is secured at the lower part of its circumference to the rear margin of the plate 21. Within the top part of the bag is a rigid former 37 which defines a duct 38.

When the plate 21 is lowered by the jack 34 and links 33, thus opening up the scoop gap 28, the bag 35 is deployed by inflating it with compressed air entering from the duct 38 through apertures 39. The circumference of the bag stretches upon inflation, and the bag adopts a configuration such that it forms a bluff substantially semi-cylindrical wing trailing edge and also defines a slot 30 between itself and the fixed trailing portion 16 of the wing 11. Natural blowing therefore takes place through the slot 30 as before. Also, in the region of the internal duct 38 the bag circumference has a rearwardly-directed slot 40 through which forced blowing of air takes over the bluff surface to give additional boundary layer control.

Modifications of the arrangements described are, of course, possible without departing from the scope of the invention. Thus, in FIGS. 1 to 5, forced air blowing from the interior of the segment 10 through a rearwardly-directed slot thereof may be employed; or in either embodiment forced blowing may take place through a slot or slots in the fixed trailing portion 16 of the wing, in addition to, or instead of, the forms of blowing already described. If forced blowing is employed, natural blowing may be omitted, if desired. The gap 28 and slot 30 are then no longer required so that the segment 10 and/or the plate 21 can be directly hinged on the wing trailing portion 16, or the top of the bag 35 can be attached directly to the rear margin of this trailing portion.

All the schemes described are used in conjunction with leading edge devices, e.g., drooped leading edge, leading edge slat or leading edge blowing.

What I claim is:

1. An aircraft wing, having a main body and a trailing portion, with a recess in the underside of said trailing portion, a high lift device comprising a plurality of interconnected members stowed in a folded condition in said recess when the device is not in use, and means for unfolding and extending said interconnected members into an operative condition below said recess thereby to form on the trailing portion of the wing an under and rear surface which is made up of a convexly curved approximately semi-cylindrical bluff rear part extending downward from the region of the wing trailing edge to a position well below the level of the undersurface of the main body of the wing, and a substantially flat under part, connected at its rear edge to said convexly curved bluff rear part of said position well below the main body surface level, and extending therefrom forward and upward to a region adjacent the forward extremity of said recess, at least one slot being defined in the region of the upper extremity of said convexly curved bluff part to issue air rearwardly over said convexly curved bluff part.

2. A wing according to claim 1, wherein forced blowing is provided through said at least one slot.

3. A wing according to claim 1, wherein natural blowing of air from the lower wing surface is provided through said at least one slot.

4. A wing according to claim 1, wherein the high lift device comprises an inflatable flexible bag.

5. A wing according to claim 4, wherein the material of the bag is stretchable circumferentially upon inflation.

6. A wing according to claim 4, wherein, in the operative condition of the device, forced blowing takes place through said slot which slot is formed in the upper part of the circumference of the bag.

7. A wing according to claim 1, wherein the high lift device comprises movable rigid segments hinged to one another.

8. A wing according to claim 7, wherein, in the operative condition of the device, natural blowing takes place through said slot which slot is formed between one of said rigid segments, and a fixed trailing edge portion of the wing.

9. A wing according to claim 7, wherein the high lift device comprises a generally flat lower plate that substantially closes off the recess when the device is stowed but drops below the wing main body, when the device is extended, into a disposition in which it slopes down in the rearward direction to form said substantially flat surface part and creates a scoop-type gap between its leading edge and the bottom of an adjacent main body region of the wing to gather air for naturally blowing said slot.

10. A wing according to claim 9, wherein the segments and the plate are hinged together to form a substantially continuous articulated surface.

11. A wing according to claim 10, wherein during extension and retraction the segments are carried rearward and forward on a trolley running along a fore-and-aft curved track that is fixed to the trailing portion of the wing above the recess.